US009772970B2

(12) United States Patent
Luo et al.

(10) Patent No.: US 9,772,970 B2
(45) Date of Patent: Sep. 26, 2017

(54) MULTI-PROTOCOL SERIAL COMMUNICATION INTERFACE

(71) Applicant: Atmel Corporation, San Jose, CA (US)

(72) Inventors: Yong Luo, Cupertino, CA (US); Ian Fullerton, Tanem (NO); Benjamin Francis Froemming, San Jose, CA (US); Morten Werner Lund, Tiller (NO)

(73) Assignee: Atmel Corporation, San Jose, CA (US)

( * ) Notice: Subject to any disclaimer, the term of this patent is extended or adjusted under 35 U.S.C. 154(b) by 658 days.

(21) Appl. No.: 14/014,128

(22) Filed: Aug. 29, 2013

(65) Prior Publication Data

US 2015/0067206 A1   Mar. 5, 2015

(51) Int. Cl.
*G06F 13/42* (2006.01)

(52) U.S. Cl.
CPC ...... *G06F 13/4282* (2013.01); *G06F 13/4291* (2013.01); *G06F 13/4295* (2013.01)

(58) Field of Classification Search
CPC ....... G06F 13/36; G06F 13/42; G06F 13/4282
USPC ................................. 710/105, 313, 104, 110
See application file for complete search history.

(56) References Cited

U.S. PATENT DOCUMENTS

| 4,570,217 A * | 2/1986 | Allen .................. G06F 1/14 700/83 |
| 2005/0172059 A1* | 8/2005 | Yoshimura ............... G06F 9/54 710/110 |
| 2008/0027587 A1* | 1/2008 | Nickerson ............. A01G 25/16 700/284 |
| 2009/0132751 A1* | 5/2009 | Simmons ............. G06F 13/385 711/5 |
| 2013/0290577 A1* | 10/2013 | Fugate ............... G06F 13/4081 710/105 |

* cited by examiner

*Primary Examiner* — Tim T Vo
*Assistant Examiner* — Kim T. Huynh
(74) *Attorney, Agent, or Firm* — Fish & Richardson P.C.

(57) ABSTRACT

Systems and methods for multi-protocol serial communication interfaces are described. One example system includes an interface module including a buffer for storing a protocol selection. The system includes a protocol module coupled to the interface module and configured for providing one or more serial communication protocols. Based on the protocol selection, one of the serial communication protocols is selected. The system also includes a serial engine module coupled to the interface module and the protocol module. The serial engine module is configured for transmitting and receiving data or commands based on the selected serial communication protocol.

19 Claims, 5 Drawing Sheets

| baud register value | baud rate |
|---|---|
| 0 | 3 MHz |
| 407 | 2.981 MHz |
| 809 | 2.963 MHz |
| ... | |
| 65206 | 15.11 kHz |
| 65207 | 15.06 kHz |
| 65208 | 15.01 kHz |

FIG. 5

MULTI-PROTOCOL SERIAL COMMUNICATION INTERFACE

TECHNICAL FIELD

This disclosure relates generally to electronics including interfaces.

BACKGROUND

Serial communication interfaces are widely used in touch controllers, microcontrollers, peripheral devices, baseband application processor or system-on-chip (SOC) applications, etc. A number of serial communication protocols can be used for communicating over serial communication interfaces. As an example, inter integrated circuit (I2C), system management bus (SMBus), two wire interface (TWI), serial peripheral interface (SPI), or universal synchronous and asynchronous receiver and transmitter (USART) are serial communication protocols that may be used for communication through serial communication interfaces.

SUMMARY

In one aspect, a system includes an interface module including a buffer for storing a protocol selection; a protocol module coupled to the interface module and configured for providing one or more serial communication protocols, wherein one of the serial communication protocols is selected based on the protocol selection; and a serial engine module coupled to the interface module and the protocol module. The serial engine module is configured for transmitting and receiving data or commands based on the selected serial communication protocol.

In another aspect, a method includes receiving a signal to select a serial communication protocol; selecting a serial communication protocol, based on the received signal, from a plurality of serial communication protocols; and configuring a serial communication interface based on the selected serial communication protocol. The configuration includes setting a baud rate, setting communications ports, and setting registers. The method also includes enabling the serial communication interface based on the selected serial communication protocol; and transmitting or receiving data or commands using the enabled serial communication interface and the selected serial communication protocol.

In another aspect, a method includes receiving a signal to change a serial communication protocol of a serial communication interface; disabling the serial communication interface; selecting a new serial communication protocol, based on the received signal, from a plurality of serial communication protocols; and reconfiguring the serial communication interface based on the selected serial communication protocol. The reconfiguration includes resetting a baud rate, resetting communications ports, and resetting registers. The method also includes enabling the serial communication interface.

Implementations may include one or more of the following features. The serial communication protocols may include inter integrated circuit bus interface protocol, system management bus interface protocol, serial peripheral bus interface protocol, or universal synchronous and asynchronous receiver and transmitter bus interface protocol. The interface module may include control and status registers, a baud register, and transmit and receive registers.

The serial engine module may include one or more transmitters for sending data or commands, one or more receivers for receiving data or commands, a baud rate generator for generating a baud rate of the system, and an address module for matching addresses.

The interface module may receive a protocol selection and the protocol selection may be stored in one of the control and status registers, wherein the interface module may select one of the serial communication protocols based on the stored protocol selection. The interface module may receive a baud value and the baud value may be stored in the baud register, and wherein the serial engine module may be configured to calculate a baud rate based at least in part on the stored baud value.

The system can be configured to generate an internal clock, and wherein the serial engine module may be configured to calculate a baud rate based at least in part on the internal clock. The system can be configured to receive an external clock, and wherein the serial engine module may be configured to calculate a baud rate based at least in part on the external clock.

The system can be part of an integrated circuit chip and the integrated chip may include a processor, or a controller. The system may be coupled to a port control module, and the serial engine module may configure the port control module for communicating through communication pins. The address module may be configured for matching one address with a mask, matching one address without a mask, matching two unique addresses, or matching an address with a range of addresses.

The received signal may be generated by an external module including a processor, or a controller. Receiving a signal to select a serial communication protocol may include holding the received signal in a memory buffer or register. Setting a baud rate may include receiving a baud values, and calculating the baud rate based at least in part on the baud value. Setting a baud rate may include receiving an external or an internal clock, and calculating the baud rate based at least in part on the received clock rate.

The method may include extracting an address of packet and matching with one address without a mask, one address with a mask, two distinct addresses, or a range of addresses. The method may further include configuring a port control module with the selected serial communication protocol, wherein the port control module may be coupled to communication pins.

Aspects of the invention may implement none, one or more of the following advantages. Proposed systems and methods can be used to combine the functionalities of one or more separate serial communication protocols into a single combined interface. The combined module may be commanded by a controller to select one of the serial communication protocols for the interface and transmit or receive data or commands using the selected serial communication protocol.

The details of one or more implementations are set forth in the accompanying drawings and the description below. Other aspects, features, and advantages will be apparent from the description and drawings, and from the claims.

DETAILED DESCRIPTION

Different serial communication protocols may be used for bus communication between a controller and peripheral components that are coupled to the controller. When a controller, incorporating the functionalities of one or more serial communication protocols, serially communicates with a peripheral component over a bus, a serial communication protocol may be selected and the serial communication interface of the controller may provide the required settings of the selected serial communication protocol.

Configuring the settings of a serial communication protocol on a serial communication interface may include setting the baud rate, setting the number of communication pins, setting to bi-directional (full duplex) or to single directional (half duplex) communication, selecting the master or slave status, designating transmit or receive buffers, or selecting synchronous or asynchronous mode of communication.

Figure 1:
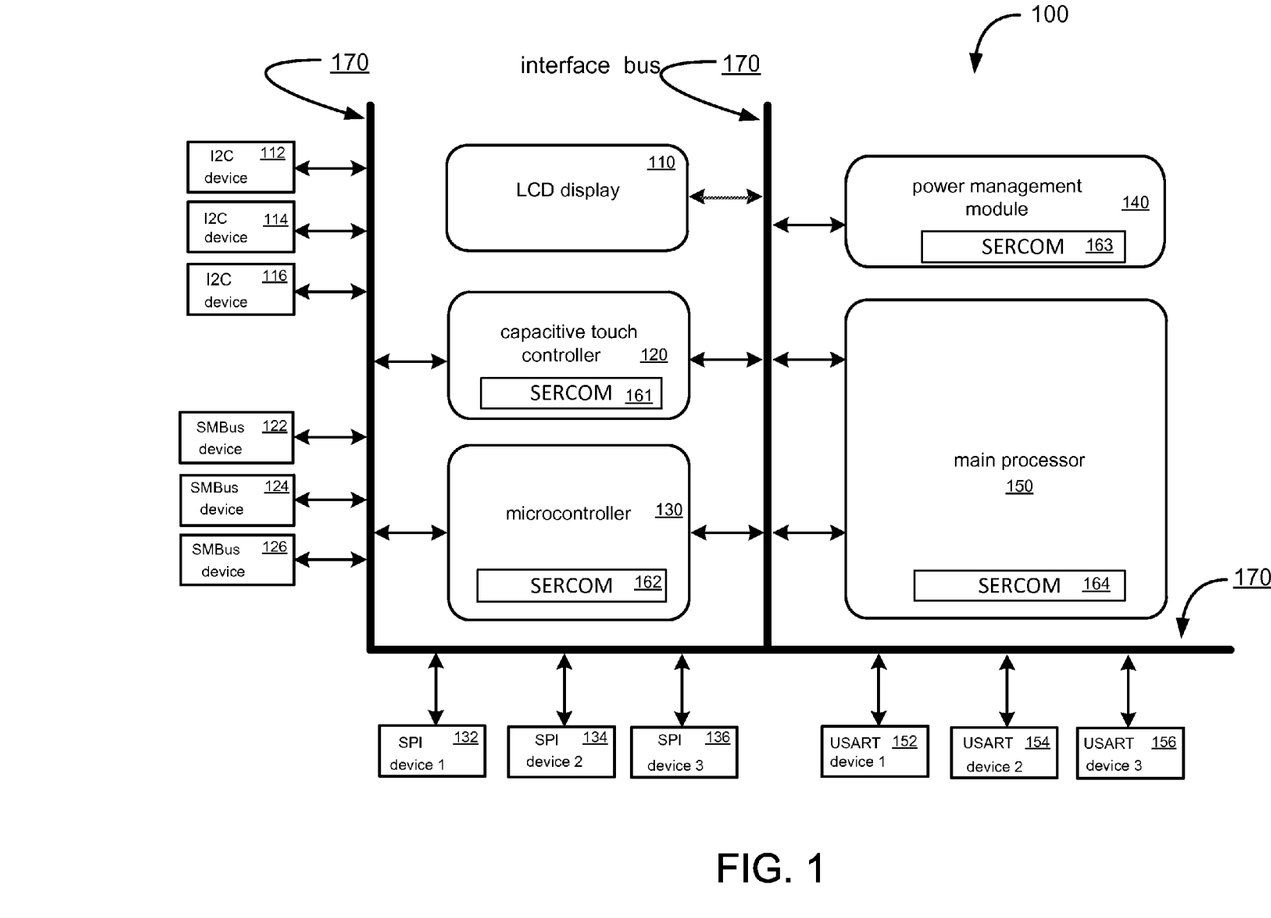
FIG. 1 is a diagram of an example system including controllers and peripheral devices.

Referring to FIG. 1, an example of a system 100 is shown that includes one or more controllers that may be coupled to each other using the interface bus 170. The controllers may include a capacitive touch controller 120, a microcontroller 130, a power management module 140, and a main processor 150.

One or more peripheral devices using different serial communication protocols may be coupled to the interface bus 170. The peripheral devices may include the I2C devices 112, 114, and 116 that may use the I2C serial communication protocol, the SMBus devices 122, 124, and 126 that may use the SMBus serial communication protocol, the SPI devices 132, 134, and 136 that may use the SPI serial communication protocol, the USART devices 152, 154, and 156 that may use the USART serial communication protocol, or the liquid crystal display (LCD) 110.

The interface bus 170 may couple the capacitive touch controller 120, the microcontroller 130, the power management module 140, or the main processor 150 to the peripheral devices. The interface bus 170 may convey two or more parallel bits and may be used for transmitting and receiving data and/or commands between the controllers 120, 130, 140, or 150 and the LCD display 110, the I2C peripheral devices 110, 112-116, the SMBus peripheral devices 122-126, the SPI peripheral devices 132-136, or the USART peripheral devices 152-156. The interface bus 170 may be used for transmitting and receiving data and/or commands using different serial communication protocols.

The peripheral devices may use different serial communication protocols. For example, peripheral devices 122-126 may use the SMBus serial communication protocol and the peripheral devices 112-126 may use the I2C serial communication protocol for transmitting and receiving data and/or commands. In another example, the peripheral devices 132-136 may use the SPI serial communication protocol and the peripheral devices 152-156 may use the USART serial communication protocol for transmitting and receiving data and/or commands.

Referring back to FIG. 1, the capacitive touch controller 120, the microcontroller 130, the power management module 140, or the main processor 150 may include respective serial communication (SERCOM) modules 161-164. The SERCOM module incorporates the functionality of one or more serial communication protocols and, depending on a setting, may be configured to implement one of the I2C, SMBus, SPI, or USART serial communication protocols. The SERCOM module is described in greater details below with respect to FIG. 2.

The capacitive touch controller 120, the microcontroller 130, the power management module 140, or the main processor 150 may communicate with one or more peripheral devices. In an example, the microcontroller 130 may communicate with the I2C device 112 and may be required to implement the serial communication protocols I2C. In another example, the microcontroller 130 may communicate with the SMBus device 124 and may be required to implement the serial communication protocols SMBus. By using the SERCOM 162 module in the microcontroller 130, the same microcontroller 130 can be used in both examples and only the configuration of the SERCOM 162 may be changed.

In some implementations, the capacitive touch controller 120, the microcontroller 130, the power management module 140, or the main processor 150 may communicate with two or more peripheral devices and two or more SERCOM modules may be implemented in each controller.

Figure 2:
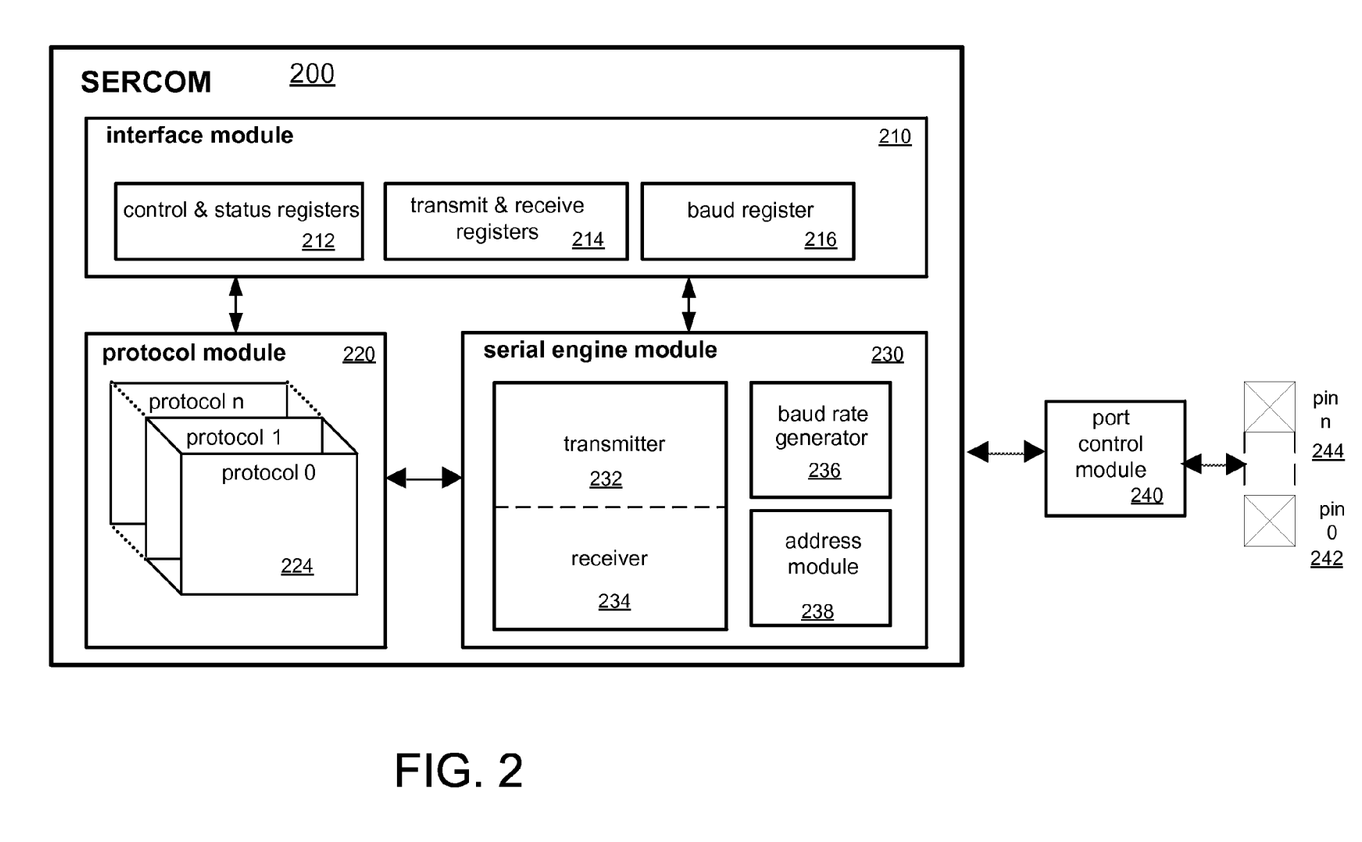
FIG. 2 is a diagram of a module that combines one or more serial communication interfaces.

Referring to FIG. 2, an example of a SERCOM module 200 is shown. The SERCOM module 200 includes an interface module 210, a protocol module 220, and a serial engine module 230. The SERCOM module 200 may incorporate the functionality of one or more serial communication protocols and at a time may execute only one serial communication protocol. The serial communication protocol may be selected based on a setting of the SERCOM module 200. In some implementations, the SERCOM module 200 may receive a protocol setting externally and may store the received setting.

The protocol module 220 may include one or more protocol configuration settings 224. As an example, the protocol module 220 may include the configuration settings 224 for the I2C, SMBus, SPI, and USART serial communication protocols. The protocol module 220 may be coupled to the interface module 210 and may receive a protocol setting from the interface module. Based on the received protocol setting, one of the protocol configurations of the protocol module 220 may be selected.

The interface module 210 may include the control and status registers 212, the transmit and receive registers 214, and the baud register 216. The control and status registers 212 may hold the protocol setting and the protocol module 220 may receive the protocol setting from the control/status registers 212. Upon initializing the SERCOM module 200 with the selected protocol configuration setting 224, one or more settings related to the selected serial communication protocol may be stored in the control and status registers 212. The initialization of the SERCOM module 200 is described in greater details below with respect to FIG. 3.

As an example, when the SERCOM module 200 is implementing the SPI serial communication protocol, the control and status registers 212 may be used to configure the SERCOM module 200 into performing as an SPI interface, the configuration may include the SERCOM module 200 performing in master or slave modes. The control and status registers 212 may be used for storing all or a part of the selected protocol configuration settings 224.

The baud register 216 may store a baud value. The baud value may be used by the serial engine module 230 to calculate a baud rate. In some implementations, the baud value is a number between 0 and 65,536. In some implementations, the baud register 216 may be set when a configuration settings 224 is selected. In some implementations, the SERCOM module 200 may receive a baud value externally and may store the value in the baud register 216.

The transmit and receive registers 214 may be used by the serial engine module 230 as a storage buffers during transmitting and receiving data and/or commands from/to the SERCOM module 200.

The serial engine module 230 may be couple to the protocol module 220 and the interface module 210 and may include a baud rate generator 236. The baud rate generator 236 may receive an internal clock of the SERCOM module 200 and may calculate a baud rate based on a frequency of the received internal clock and the baud value of the baud register 216. In some implementations, the baud rate generator 236 may receive a clock external to the SERCOM module and may calculate a baud rate based on a frequency of the received external clock and the baud value of the baud register 216.

Figure 5:
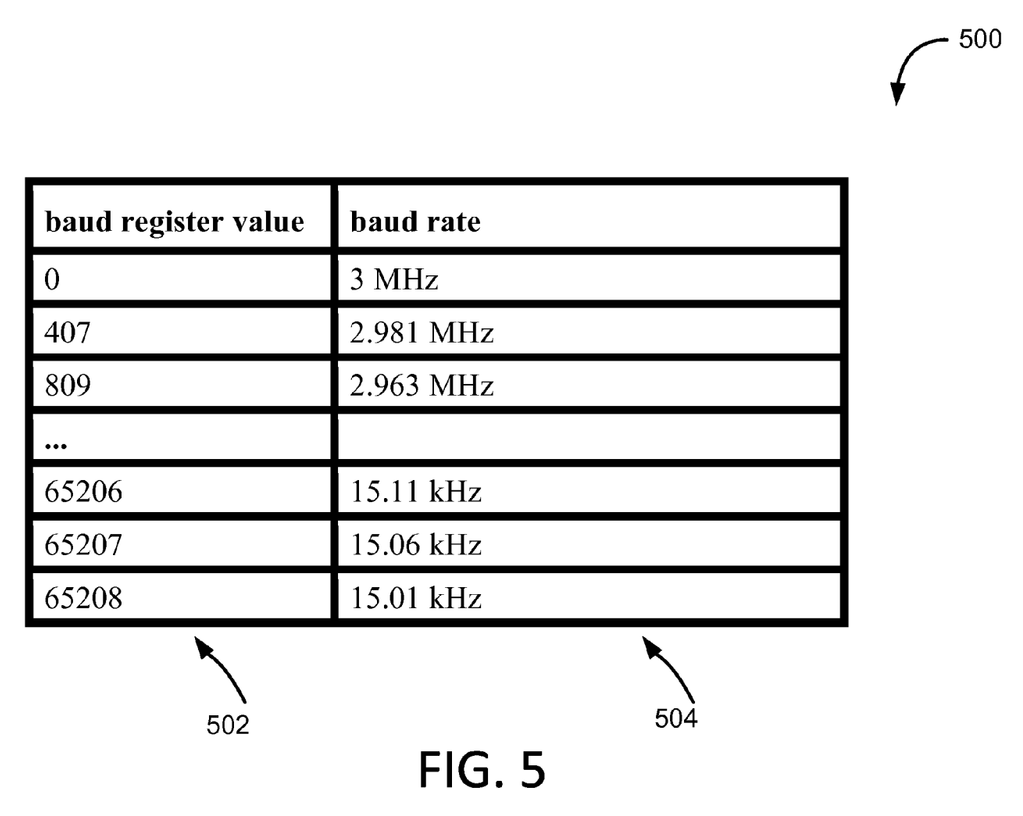
FIG. 5 is a table including examples of values for baud register and baud rates for asynchronous communication.

As an example the baud rate generator 236 may calculate the baud rate (FB) of synchronous communication as $FB=FR/[2(BV+1)]$ and the baud rate (FB) of the asynchronous communication as $FB=FR(1-BV/65,536)/16$ where BV is the baud value of the baud register 216 and FR is a baud reference frequency of the internal or external clocks. Table 500 of FIG. 5 shows examples of values for the baud register 216 in column 502 and the calculated baud rates (FB) for asynchronous communication in column 504 when the baud reference frequency is 48 MHz.

The serial engine module 230 may include the transmitter 232 and the receiver 234. The transmitter 232 and the receiver 234 send and receive data and/or commands based on the selected serial communication protocol and based on the selected serial communication protocol may use one or more transmit and receive registers 214 for buffering data during transmitting and receiving processes. In some implementations, the SERCOM module 200 may be coupled to a port control module 240 and the port control module 240 may be configured by the SERCOM module 200 based on the selected serial communication protocol.

In some implementations, the serial engine module 230 including the transmitter 232, the receiver 234, and the address module 238 may be coupled to the device interface pins 242 to 244 through the port control module 240 and may communicate through the port control module 240. In some implementations, the port control module 240 may be combined into the SERCOM module 200 and the device interface pins 242 to 244 coupled to the combined module may perform as general purpose input output (GPIO) pins and the interface bus 170 may perform as a GPIO expander.

The serial engine module 230 may also include an address module 238. The address module 238 may match an address with a mask, may match two addresses, or may match an address with an address range. In some implementations, the received data packets may include an address and the address matching of the address module 238 may be used to extract the received address and/or validate the received address with an address range.

In some implementations, the SERCOM module 200 may enter into a sleep mode to conserve power consumption. In some implementations, when acting as slave the SERCOM module 200 may fully operate in sleep mode. As an example, when the SERCOM module is implementing I2C or SPI serial communication protocols in slave mode, the SERCOM module 200 may fully operate in sleep mode.

In some implementations, one or more SERCOM modules 200 may be implemented as integrated circuit modules inside a processor or a controller chip. In some implementations, the SERCOM module 200 and the control module 240 may be implemented as integrated circuit modules inside a processor or a controller chip and the port control module 240 of the chip may be used to configure the device interface pins 242 to 244. In some implementations the SERCOM module may be implemented in baseband application processors operating at clock frequencies of 1 to 5 GHz (e.g., 1 GHz).

In some implementations, a SERCOM module 200 may be reconfigured and another serial communication protocol may be selected when the SERCOM module 200 is running. The re-configuration of the SERCOM module 200 is described in greater details below with respect to FIG. 4.

Figure 3:
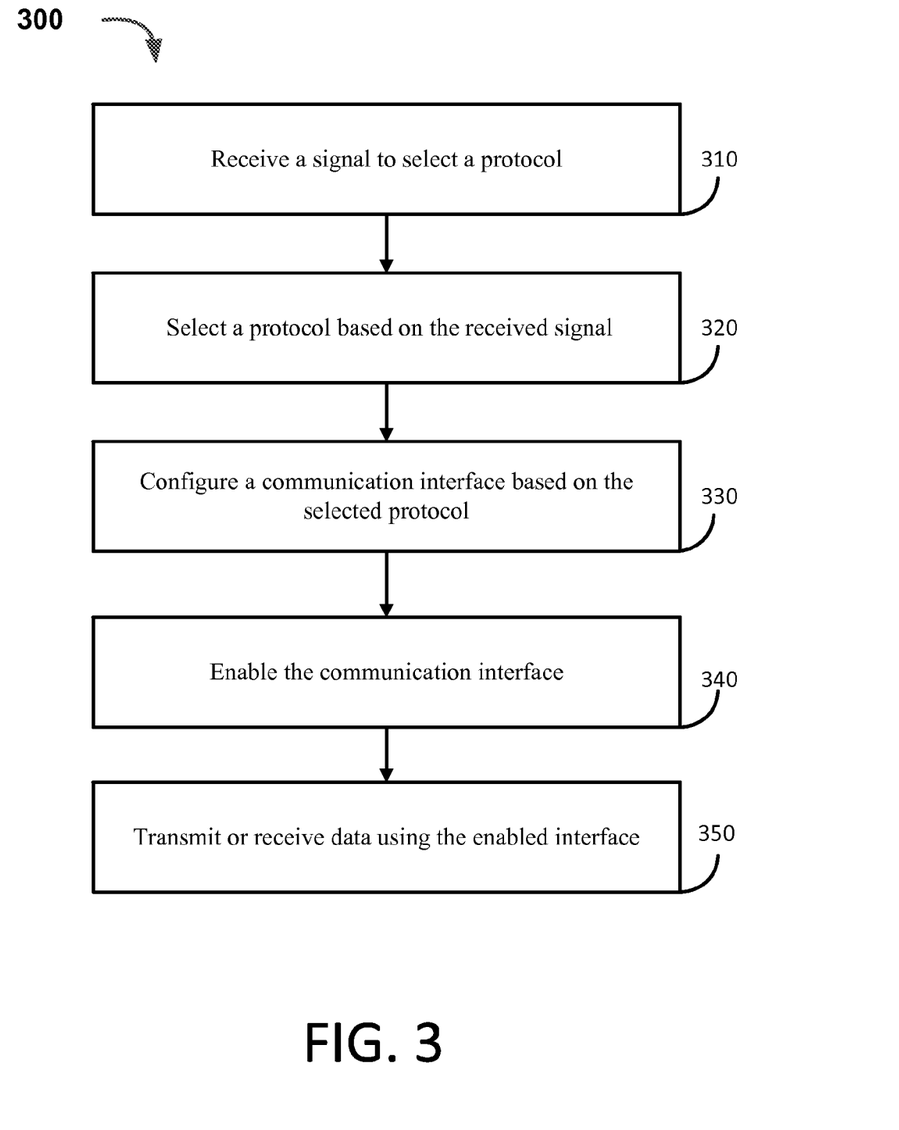
FIG. 3 is a flow diagram of an example method for enabling one of the serial communication interfaces.

Referring to FIG. 3, a flow diagram for a method 300 for initializing a SERCOM module 200 is shown. As an example, the method 300 can be implemented by the SERCOM module 200 of FIG. 2. The method includes receiving a signal to select a serial communication protocol (310). As an example, the signal can be received from a controller external to the SERCOM module 200 and the received signal can be saved in one of the control and status registers 212. In some implementations, the external controller may directly set the control and status registers 212 of the SERCOM module 200.

Based on the received signal, a protocol is selected (320). As an example the protocol module 220 may receive the selected serial communication protocol from the control and status registers 212 and based on the received selection may select one of the protocol configuration settings 224.

Based on the selected serial communication protocol, the serial communication module is configured (330). As an example the SERCOM module 200 may be configured by setting the control and status registers 212 and baud register 216, setting the port control module 240, selecting a clock, and calculating a baud rate by the baud rate generator 236. In some implementations, configuring the communication interface may include setting the number of communication pins, setting to bi-directional (full duplex) or single directional (half duplex) communication, selecting the master or slave status, selecting transmit or receive buffers, or selecting synchronous or asynchronous communication. In some implementations, during configuration, transmitting and receiving data and/or commands are disabled.

The serial communication interface is enabled (340). As an example, the enable signal may be received from a controller external to the SERCOM module 200. In some implementations, the external controller may directly enable the SERCOM module 200 through setting one of the control and status registers 212. In some implementations, during configuration and until the serial communication interface is enabled, transmitting and receiving data and/or commands are disabled.

Transmit or receive data using the enabled serial communication interface (350). As an example, when the serial communication interface is enabled, the SERCOM module 200 may start transmitting and receiving data and/or commands using the selected serial communication protocol through the interface bus 170.

Figure 4:
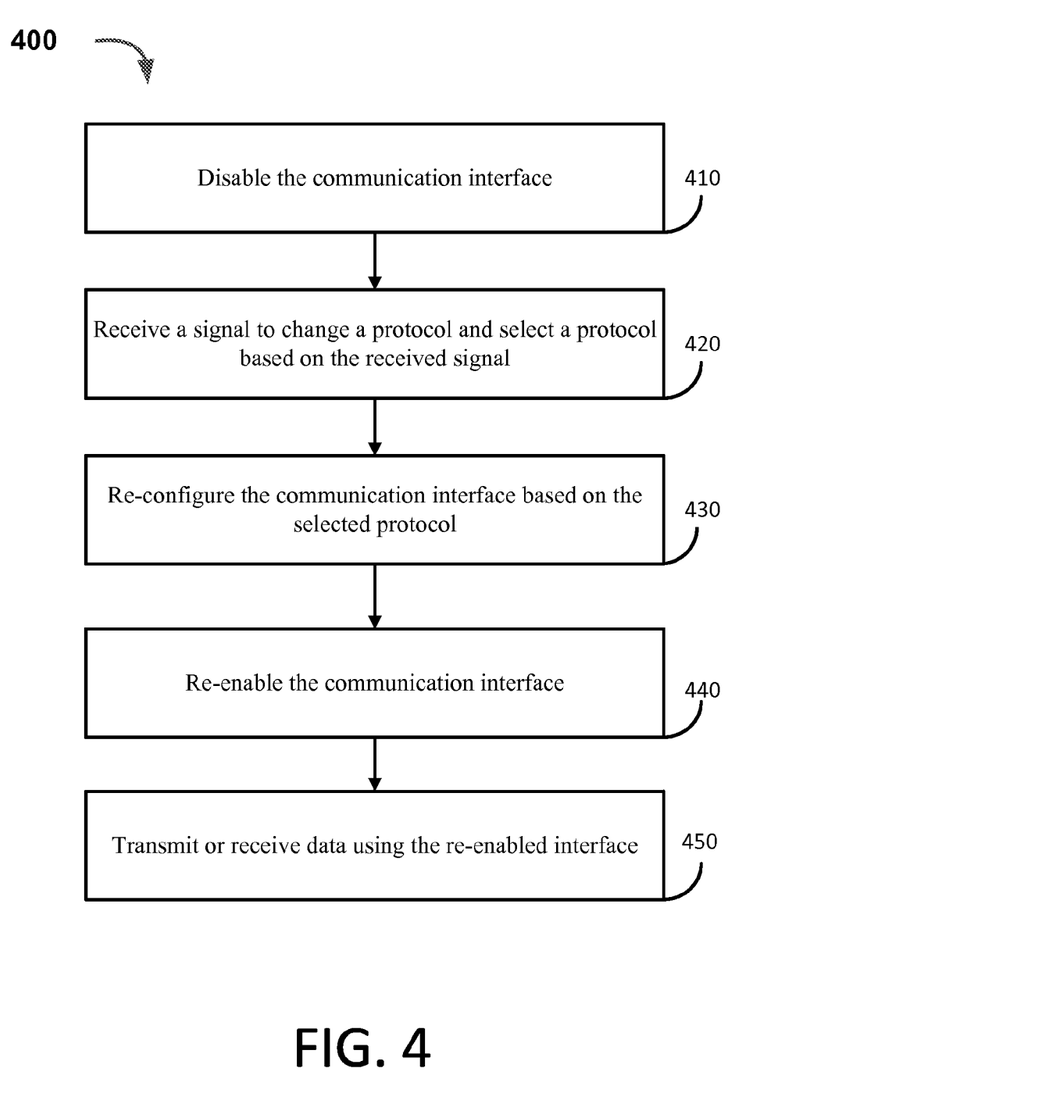
FIG. 4 is a flow diagram of an example method for re-configuring a module to another serial communication interface.

Referring to FIG. 4, a flow diagram for a method 400 for re-configuring the serial communication protocol of an already running serial communication interface is shown. As an example, the method 400 can be implemented by the SERCOM module 200 of FIG. 2. The method includes disabling the serial communication interface (410). As an example, a controller external to the SERCOM module 200 may set a value on one of the control and status registers 212. In some implementations, the external controller may directly set the control and status registers 212 of the SERCOM module 200 and the communication may immediately stop responding.

A signal is received to change the serial communication protocol and based on the received signal select another serial communication protocol (420). As an example, the signal can be received from a controller external to the SERCOM module 200 and the received signal can be saved in one of the control and status registers 212. In some implementations, the external controller may directly set the control and status registers 212 of the SERCOM module 200. As an example the protocol module 220 may receive the selected protocol from one of the control and status registers 212 and based on the received selection may select one of the protocol configuration settings 224.

Based on the selected protocol, the communication interface is re-configured (430). As an example the SERCOM module 200 may be re-configured by setting the control and status registers 212 and baud register 216, setting the port control module 240, selecting a clock, and calculating a baud rate by the baud rate generator 236. In some implementations, re-configuring the communication interface may include setting the number of communication pins, setting to bi-directional (full duplex) or single directional (half duplex) communication, selecting the master or slave status, selecting transmit or receive buffers, or selecting synchronous or asynchronous communication.

The communication interface is re-enabled (440). As an example, the enable signal may be received from a controller external to the SERCOM module 200. In some implementations, the external controller may directly enable the SERCOM module through setting one of the control and status registers 212. In some implementations, during re-configuration and until the serial communication interface is re-enabled, transmitting and receiving data and/or commands are disabled.

Data is transmitted or received using the re-enabled serial communication interface (450). As an example, when the serial communication interface is re-enabled, the SERCOM module 200 may start transmitting and receiving data and/or command through the interface bus 170 using the newly selected serial communication protocol.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    an interface module including a buffer or register for storing a protocol selection;
    a protocol module coupled to the interface module and configured for providing configuration data for one of two or more serial communication protocols based on the protocol selection;
    a serial engine module coupled to the interface module and the protocol module, the serial engine module configured for:
        determining from the protocol selection that data or commands are to be transmitted and received on a serial communication bus using synchronous communication;
        determining that a port control module coupled to the serial communication bus is configured for asynchronous communication on the serial communication bus;
        reconfiguring the port control module from asynchronous serial communication to synchronous serial communication on the serial communication bus, including selecting one of an internal or an external clock signal for synchronous communication on the serial communication bus; and
        transmitting and receiving data or commands over the serial communication bus synchronously using the clock signal.

2. The system of claim 1, wherein the serial communication protocols include:
    at least one of serial peripheral bus interface protocol or inter integrated circuit bus interface protocol; and
    universal synchronous and asynchronous receiver and transmitter bus interface protocol.

3. The system of claim 1, wherein the interface module includes:
    control and status registers;
    a baud register; and
    transmit and receive registers.

4. The system of claim 1, wherein the serial engine module includes:
    one or more transmitters for sending data or commands;
    one or more receivers for receiving data or commands;
    a baud rate generator for generating a baud rate of the system; and
    an address module for matching addresses.

5. The system of claim 3, wherein the interface module receives a protocol selection and the protocol selection is stored in one of the control and status registers, and wherein the interface module selects one of the serial communication protocols based on the stored protocol selection.

6. The system of claim 3, wherein the interface module receives a baud value and the baud value is stored in the baud register, and wherein the serial engine module is configured to calculate a baud rate based at least in part on the stored baud value.

7. The system of claim 6, wherein the system is configured to generate an internal clock, and wherein the serial engine module is configured to calculate a baud rate based at least in part on the internal clock.

8. The system of claim 6, wherein the system is configured to receive an external clock, and wherein the serial engine module is configured to calculate a baud rate based at least in part on the external clock.

9. The system of claim 1, wherein the system is part of an integrated circuit chip, the integrated chip including a processor, or a controller.

10. The system of claim 1, wherein the port control module is coupled to the serial engine module and the serial engine module configures the port control module for communicating through communication pins.

11. The system of claim 4, wherein the address module is configured for:
    matching one address with a mask;
    matching one address without a mask;
    matching two unique addresses; or
    matching an address with a range of addresses.

12. A method comprising:
    receiving a signal to select a serial communication protocol;

selecting a serial communication protocol, based on the received signal, from a plurality of serial communication protocols for communicating over a serial communication bus;

determining that a serial communication using the selected serial communication protocol is synchronous serial communication;

determining that a port control module coupled to the serial communication bus is configured for asynchronous communication on the serial communication bus;

reconfiguring the port control module from asynchronous serial communication to synchronous serial communication on the serial communication bus, including selecting one of an internal or an external clock signal for synchronous communication on the serial communication bus; and transmitting or receiving data or commands using the enabled serial bus interface and the selected serial communication protocol.

13. The method of claim 12, where the received signal is generated by an external module including
a processor, or
a controller.

14. The method of claim 12, wherein the plurality of serial communication protocols, include:
at least one of serial peripheral bus interface protocol or inter integrated circuit bus interface protocol, and
universal synchronous and asynchronous receiver and transmitter bus interface protocol.

15. The method of claim 12, wherein receiving a signal to select a serial communication protocol includes holding the received signal in a memory buffer or register.

16. The method of claim 12, further comprising:
receiving a baud value, and
calculating a baud rate based at least in part on the baud value.

17. The method of claim 12, wherein setting a baud rate includes
receiving an external or an internal clock, and
calculating the baud rate based at least in part on the received clock rate.

18. The method of claim 12, further comprising
extracting an address of packet and matching with
one address without a mask,
one address with a mask,
two distinct addresses, or
a range of addresses.

19. The method of claim 12, further comprising
configuring a port control module with the selected serial communication protocol, wherein the port control module is coupled to communication pins.

\* \* \* \* \*